(12) United States Patent
Kawase et al.

(10) Patent No.: US 7,058,506 B2
(45) Date of Patent: Jun. 6, 2006

(54) PLACE GUIDANCE SYSTEM

(75) Inventors: Kazushi Kawase, Yokohama (JP); Noriyuki Yoshida, Kawasaki (JP); Kazuaki Yamaguchi, Machida (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 86 days.

(21) Appl. No.: 10/867,136

(22) Filed: Jun. 14, 2004

(65) Prior Publication Data

US 2004/0260457 A1     Dec. 23, 2004

(30) Foreign Application Priority Data

Jun. 20, 2003  (JP) .............................. 2003-176498
May 17, 2004  (JP) .............................. 2004-146287

(51) Int. Cl.
  *G01C 21/00*     (2006.01)
(52) U.S. Cl. ...................... 701/201; 701/207
(58) Field of Classification Search .................. None
See application file for complete search history.

(56) References Cited

U.S. PATENT DOCUMENTS 5,919,246 A * 7/1999 Waizmann et al. ......... 701/209
6,098,048 A * 8/2000 Dashefsky et al. ........... 705/10
6,125,326 A    9/2000 Ohmura et al.
6,480,804 B1 * 11/2002 Maeda et al. ............... 702/150
6,591,188 B1 * 7/2003 Ohler ......................... 701/209
2005/0125148 A1 * 6/2005 Van Buer et al. ........... 701/209

FOREIGN PATENT DOCUMENTS

| DE | 195 35 376 A | 4/1996 |
| EP | 1 003 018 A | 5/2000 |
| EP | 1 030 167 A | 8/2000 |
| JP | 5-18766 * | 1/1993 |
| JP | 11-149596 A | 2/1999 |
| JP | 11-153446 A | 6/1999 |
| JP | 2002-340604 A | 11/2002 |

* cited by examiner

*Primary Examiner*—Michael J. Zanelli
(74) *Attorney, Agent, or Firm*—RatnerPrestia

(57) ABSTRACT

There are provided a positioning section for locating a current position, a travel history database for storing a history of a current position located by the positioning section and a history of a travel to an institution or the like actually visited by walking or so from at least one geographic point in the history, and a destination predicting section for predicting a destination on the basis of a history of using an institution actually visited by walking or so stored in the travel history database. This makes it possible to practically predict as a destination an institution actually visited by walking or so.

15 Claims, 15 Drawing Sheets

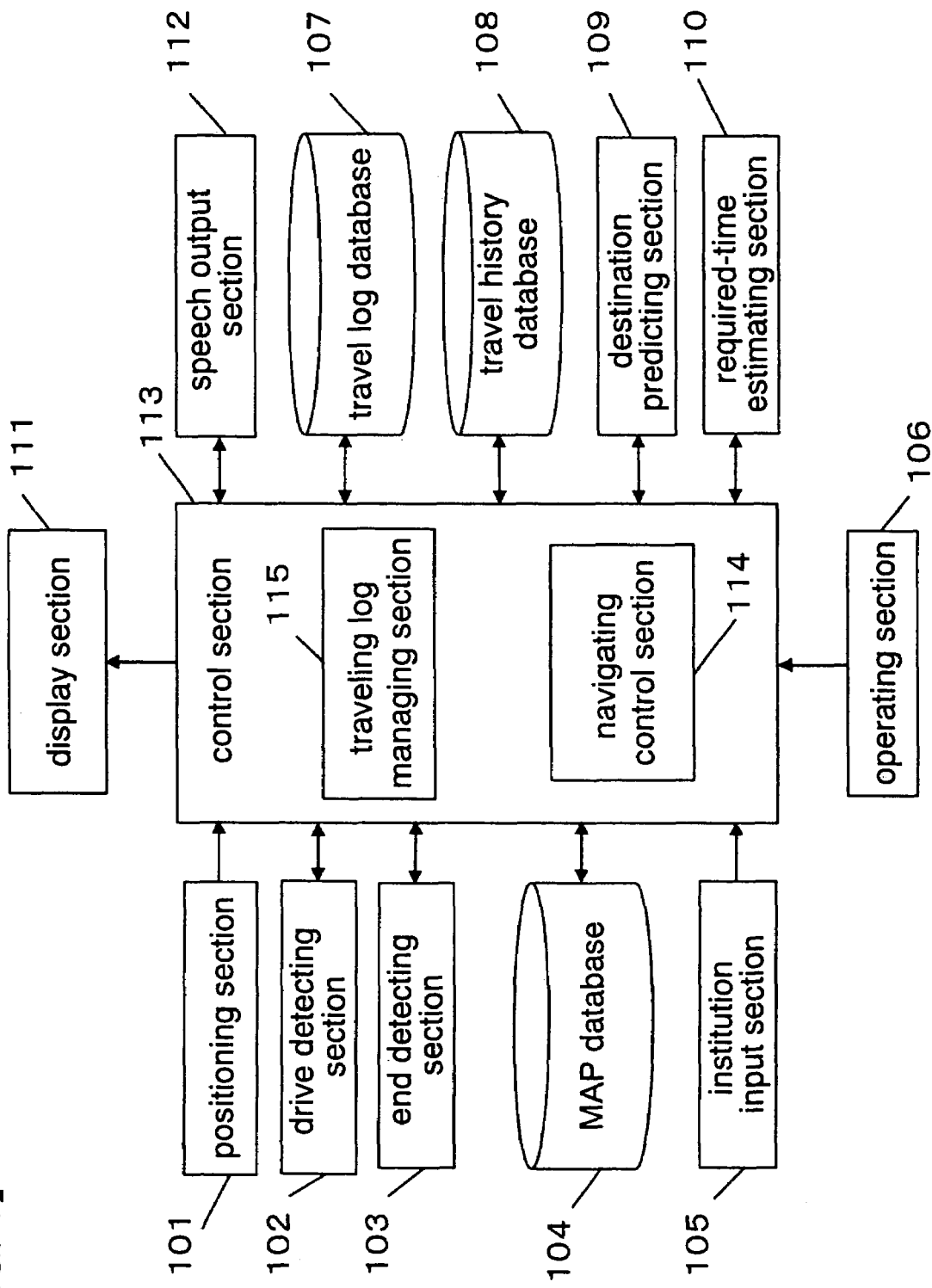
[FIG. 1]

[FIG. 2]

TRAVEL LOG DATABASE

| | date & hour | day of the week | latitude | longitude |
|---|---|---|---|---|
| starting point | 03/02/22 10:50 | Saturday | N35,39,18 | E138,22,42 |
| stop point 1 | 03/02/22 11:05 | Saturday | N35,38,17 | E138,20,11 |
| stop point 2 | 03/02/22 11:12 | Saturday | N35,38,14 | E138,20,08 |
| ⋯ | ⋯ | ⋯ | ⋯ | ⋯ |
| ⋯ | ⋯ | ⋯ | ⋯ | ⋯ |
| ⋯ | ⋯ | ⋯ | ⋯ | ⋯ |
| arrival point | 03/02/22 11:30 | Saturday | N35,36,19 | E138,20,41 |

[FIG. 3](A)

TRAVEL HISTORY DATABASE (TRAVEL HISTORY TABLE)

| point label | date & hour | day of the week | latitude | longitude |
|---|---|---|---|---|
| T department store | 03/01/19 08:00 | Sunday | N35,36,18 | E138,20,41 |
| stop point 3 | 03/01/19 08:05 | Sunday | 35,38,25 | 138,24,48 |
| stop point 4 | 03/01/19 08:13 | Sunday | 35,39,12 | 138,25,04 |
| ..... | ..... | .. | ..... | ..... |
| ..... | ..... | .. | ..... | ..... |
| ..... | ..... | .. | ..... | ..... |
| S amusement park | 03/01/19 08:28 | Sunday | N35,40,53 | E138,26,34 |

[FIG. 3](B)

TRAVEL HISTORY DATABASE (TRAVEL HISTORY TABLE)

| point label | date & hour | day of the week | latitude | longitude |
|---|---|---|---|---|
| T department store | 03/02/11 07:30 | Tuesday | N35,36,19 | E138,20,42 |
| Stop point 5 | 03/02/11 07:39 | Tuesday | N35,37,05 | E138,22,53 |
| Stop point 6 | 03/02/11 07:48 | Tuesday | N35,38,02 | E138,23,30 |
| ... | ... | ... | ... | ... |
| ... | ... | ... | ... | ... |
| ... | ... | ... | ... | ... |
| S amusement park | 03/02/11 08:10 | Tuesday | N35,40,50 | E138,26,35 |

[FIG. 3](C)

TRAVEL HISTORY DATABASE (TRAVEL HISTORY TABLE)

| point label | date & hour | day of the week | latitude | longitude |
|---|---|---|---|---|
| T department store | 03/02/15 16:10 | Saturday | N35,36,19 | E138,20,41 |
| stop point 7 | 03/02/15 16:23 | Saturday | N35,35,18 | E138,18,10 |
| stop point 8 | 03/02/15 16:31 | Saturday | N35,35,15 | E138,20,07 |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| user's home | 03/02/15 17:13 | Saturday | N35,39,18 | E138,22,42 |

[FIG. 4]

TRAVEL HISTORY DATABASE (INSTITUTION NAME TABLE)

| latitude | longitude | point label | institution actually visited | frequency |
|---|---|---|---|---|
| N35,40,50 | E138,26,35 | S amusement park | S amusement park | 10 |
| N35,40,52 | E138,26,34 | | store A | 8 |
| N35,40,53 | E138,26,34 | | store B | 5 |
| | | | store C | 3 |
| | | | store D | 1 |
| N35,36,18 | E138,20,42 | T department store | T department store | 7 |
| N35,36,19 | E138,20,41 | | store G | 4 |
| | | | store H | 3 |
| | | | store J | 1 |
| | | | store K | 1 |
| ⋮ | ⋮ | ⋮ | ⋮ | ⋮ |

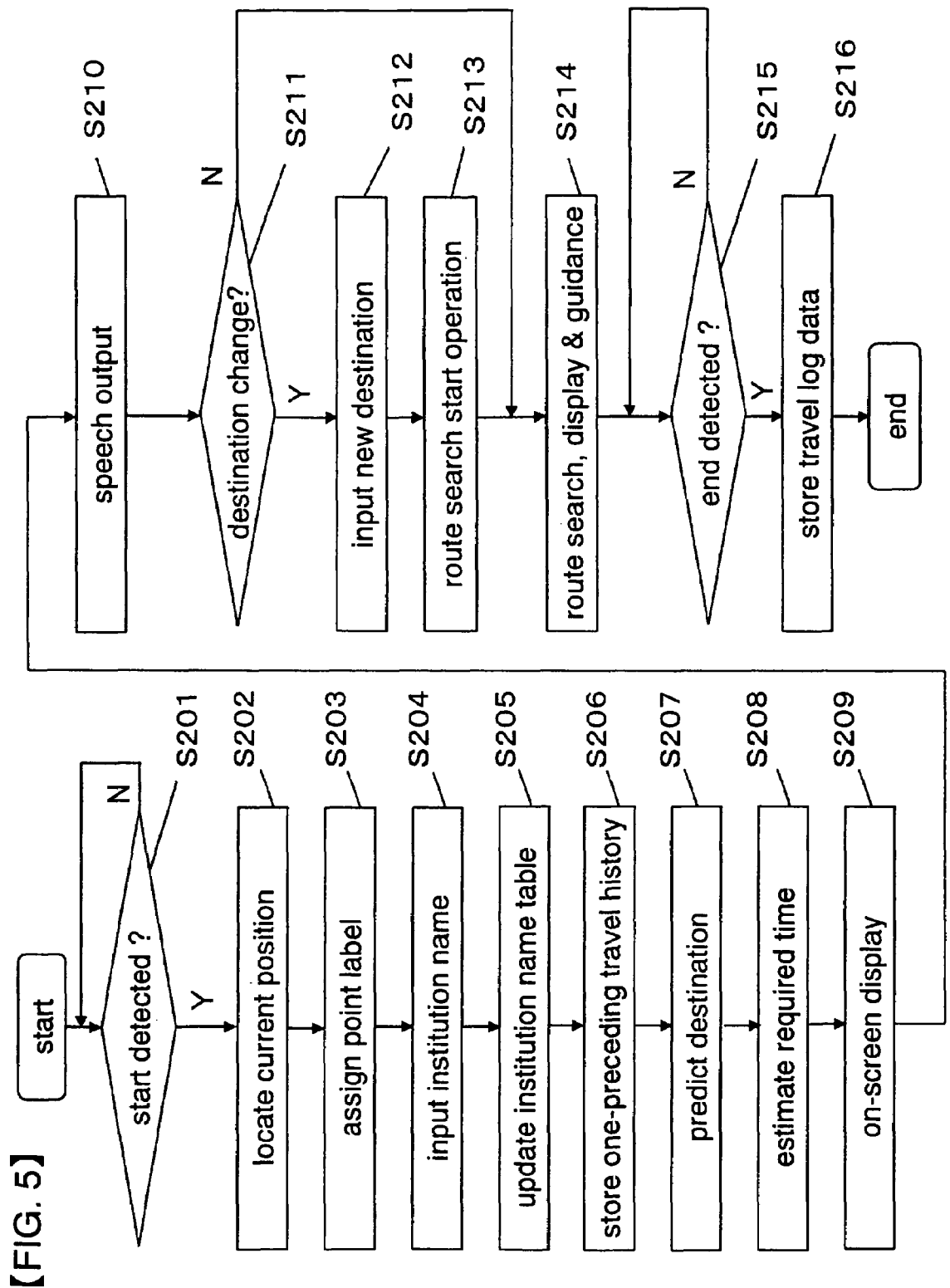

[FIG. 6]

TRAVEL LOG DATABASE

| | date & hour | day of the week | latitude | longitude |
|---|---|---|---|---|
| starting point | 03/02/22 14 : 30 | Saturday | N35,36,18 | E138,20,42 |
| stop point 1 | 03/02/22 14 : 45 | Saturday | N35,38,10 | E138,22,10 |
| stop point 2 | 03/02/22 14 : 50 | Saturday | N35,39,03 | E138,22,40 |
| ⋮ | ⋮ | ⋮ | ⋮ | ⋮ |
| arrival point | 03/02/22 15 : 43 | Saturday | N35,40,52 | E138,26,36 |

[FIG. 7]

TRAVEL HISTORY DATABASE (TRAVEL HISTORY TABLE)

| point label | date & hour | day of the week | latitude | longitude |
|---|---|---|---|---|
| user's home | 03/02/22 10:50 | Saturday | N35,39,18 | E138,22,42 |
| stop point 1 | 03/02/22 11:05 | Saturday | N35,38,17 | E138,20,11 |
| stop point 1 | 03/02/22 11:12 | Saturday | N35,38,14 | E138,20,08 |
| ... | ... | ... | ... | ... |
| ... | ... | ... | ... | ... |
| ... | ... | ... | ... | ... |
| T department store | 03/02/22 11:30 | Saturday | N35,36,19 | E138,20,41 |

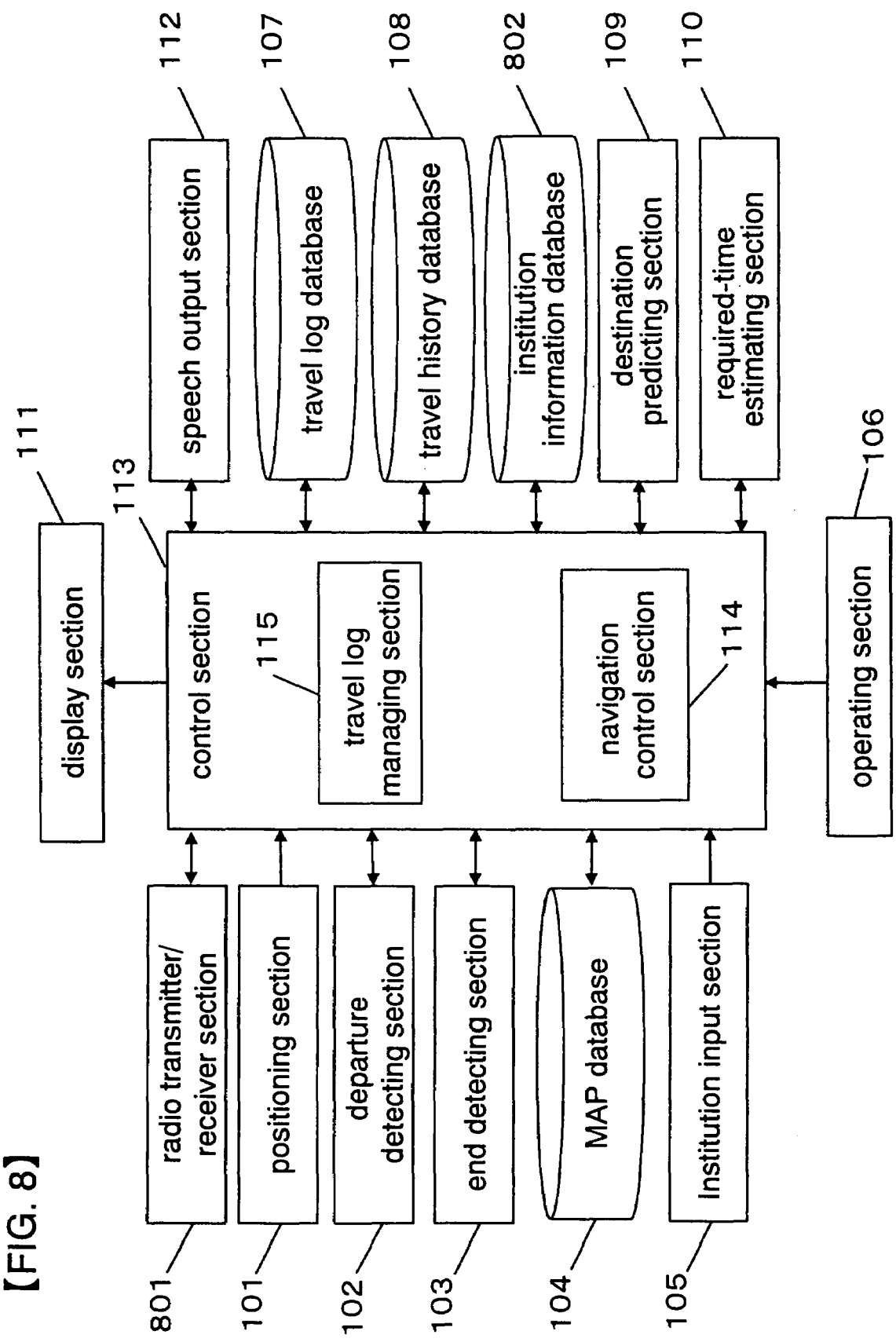
[FIG. 8]

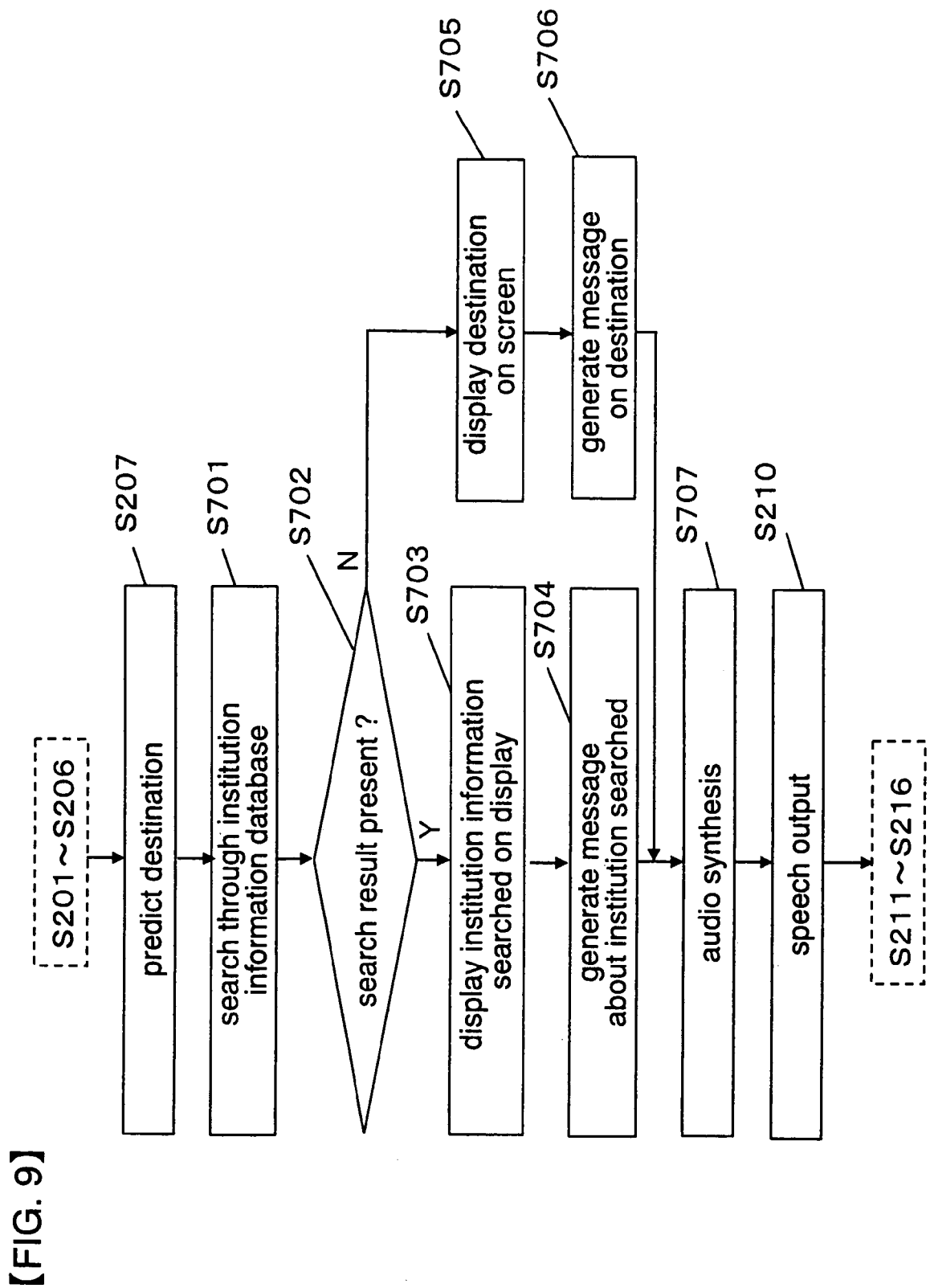
[FIG. 9]

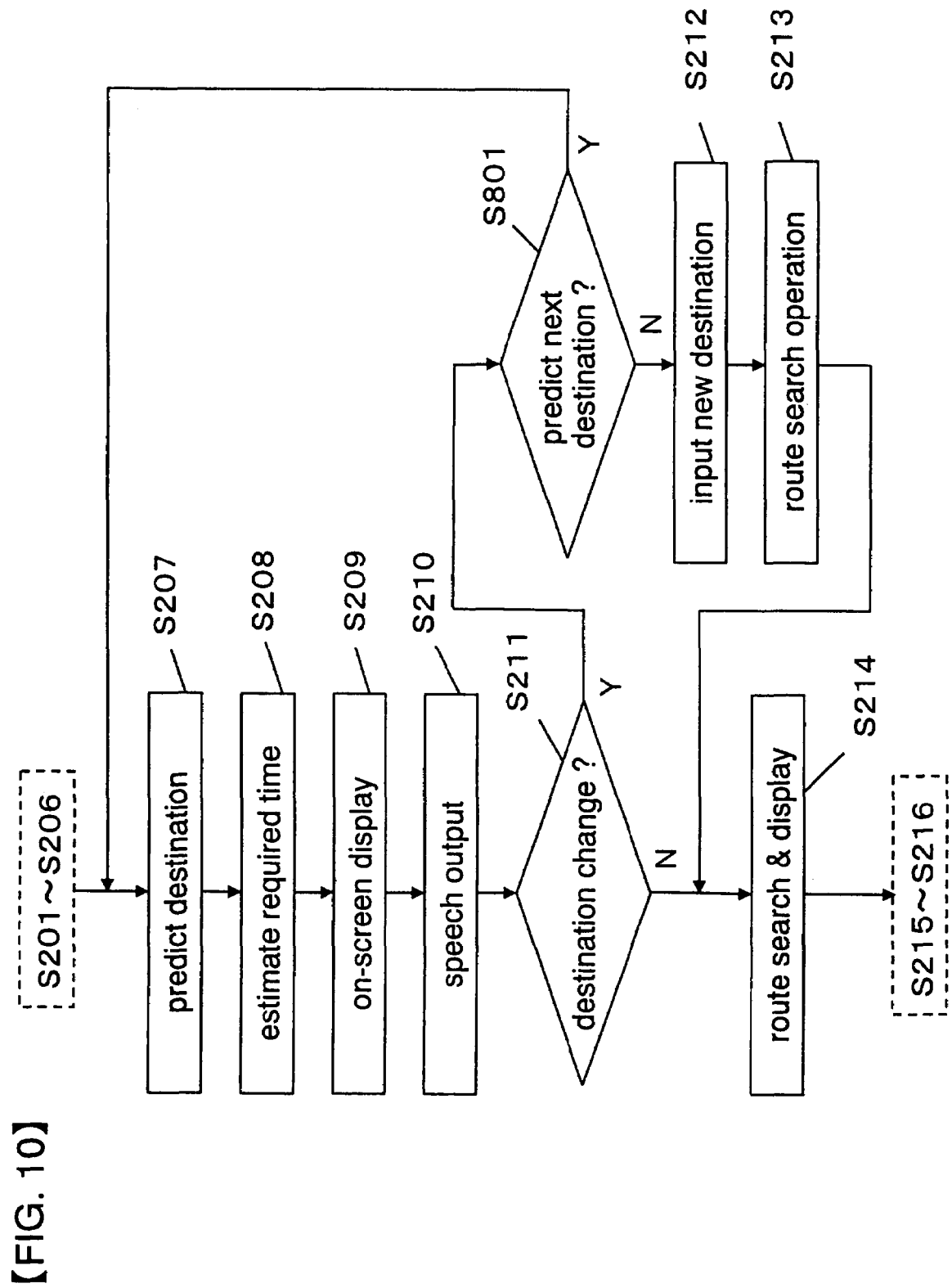
[FIG. 10]

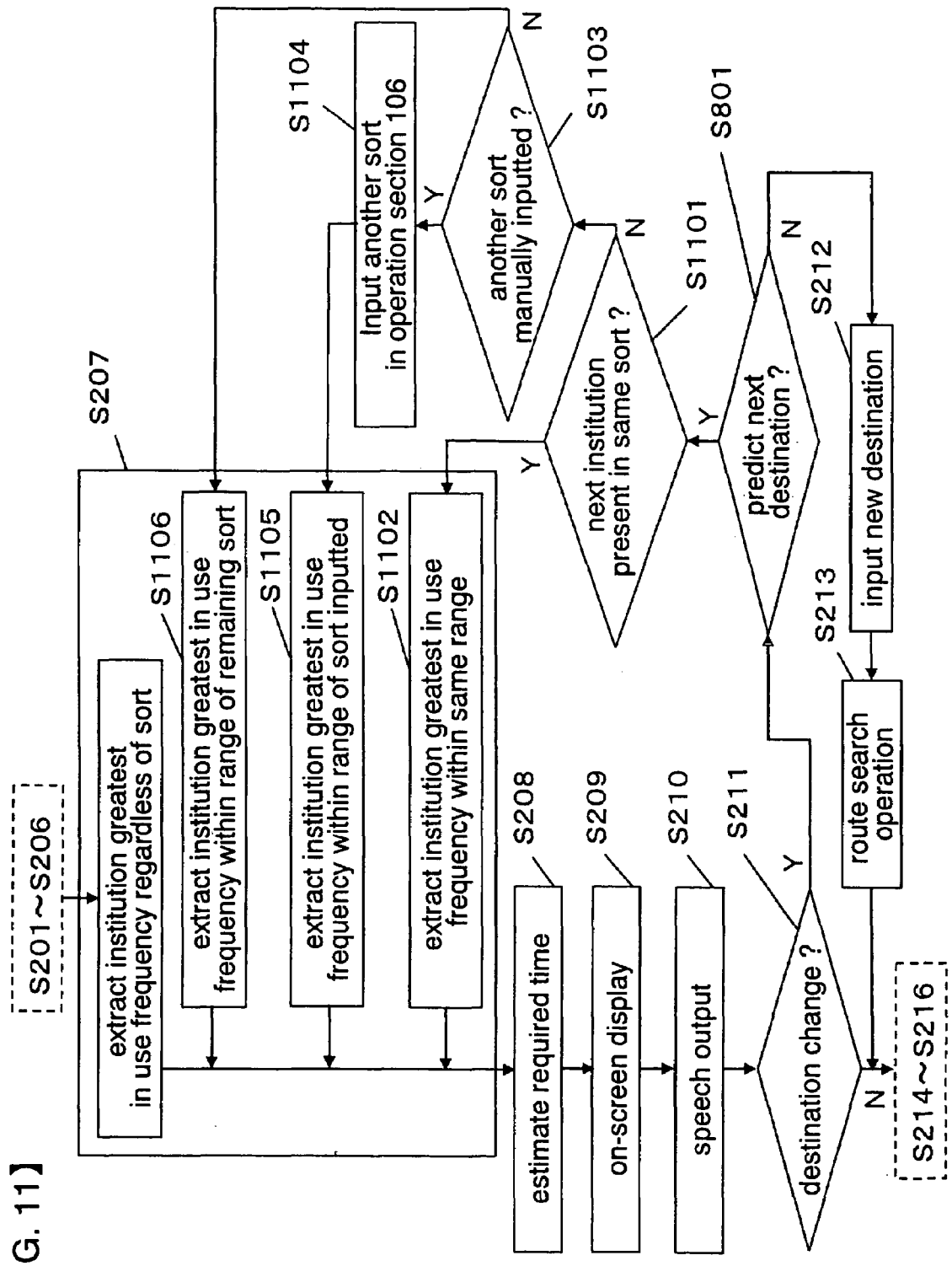
[FIG. 11]

[FIG. 12]

CATEGORY-BASED INSTITUTION NAME TABLE

| SORT (CATEGORY) | INSTITUTION NAME |
|---|---|
| GAS STATION | COMPANY (STORE H) STATION (STORE D) |
| FAST FOOD | STORE (STORE C) STORE (STORE A) |
| MOVIE THEATER | THEATER (STORE G) HOUSE (STORE J) HOUSE |
| CONVENIENCE STORE | STORE (STORE B) STORE |
| ... | ... |

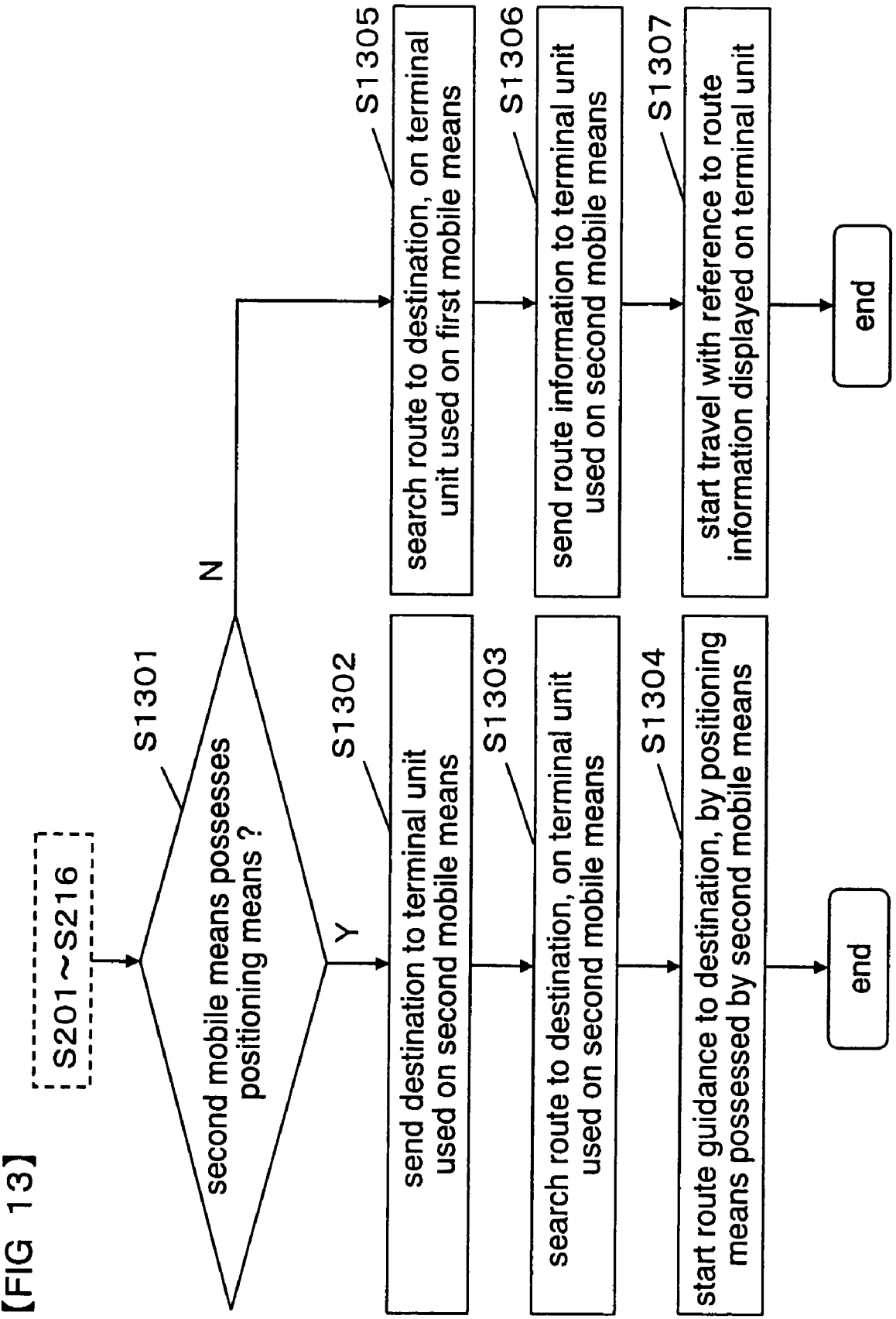

PLACE GUIDANCE SYSTEM

FIELD OF THE INVENTION

The present invention relates to a place guidance system for automatically setting a destination according to a past travel history.

BACKGROUND OF THE INVENTION

Conventionally, there is known a system described in the publication JP-A-11-149596 (Document 1) for example, as a place guidance system capable of automatically setting a destination on the basis of a past travel history.

According to the place guidance system, a destination greatest in use frequency is specified from a past travel history, to thereby set as a required time a required time highest in frequency to the destination. Because of automatically establishing a route to the destination, there is no need for inputting destinations one by one upon visiting the destination.

Meanwhile, the publication of JP-A-2002-340604 (Document 2) discloses a place guidance system arranged to associate destinations in a master-slave relationship so that a destination can be set based upon any of the master or the slave.

According to the place guidance system, AAA shopping center is associated with the stores thereof, including flower, shoe and fish stores, in a master-slave relationship so that the AAA shopping center can be set as a destination on the basis of name of the AAA shopping center or the name of a flower, shoe or fish store.

However, the place guidance system described in Document 1 is to merely store place name, time of a travel start and end point as a travel history of a position, without storing any of places visited by other means, such as walking, from the position. This accordingly involves a setback that automatic setting is unavailable with a visited place by other means.

Meanwhile, the place guidance system described in Document 2 is nothing more than to store one destination by previously associating it with a plurality of destinations just like in a master-slave relationship, making it impossible to automatically search for each of these destinations according to a use frequency thereof. Accordingly, there is a setback that setting is again needed for even a destination where it is a place to frequently visit.

SUMMARY OF THE INVENTION

The present invention has been made in view of the problem in the prior art, and it is an object thereof to provide a place guidance system capable of automatically setting as a destination also a place visited by second mobile means, such as walking, from a geographic point to which travel is made by first mobile means, such as a vehicle.

A place guidance system of the present invention comprises: positioning means for locating a current position of first mobile means; travel history storing means for storing first history information about a travel of the first mobile means positioned by the positioning means and second history information about a place visited by second mobile means from at least one geographic point of the first history information; and destination predicting means for predicting a destination on the basis of the second history information stored in the travel history storing means. Due to this, the place visited by the second mobile means can be predicted as a destination, making it possible to easily predict an actual destination for user's intention.

Meanwhile, in the place guidance system, the destination predicting means predicts the destination on the basis of use frequency information of a place visited by the second mobile means. Accordingly, it is possible to predict as a destination a place the user actually visits frequently.

Meanwhile, in the place guidance system, the second history information includes date-and-hour information of a visit by the second mobile means, the destination predicting means predicting the destination on the basis of a current position of the first mobile means positioned by the positioning means and date-and-hour information of a visit by the second mobile means. Accordingly, it is possible to predict a destination high in possibility depending upon current date-and-hour information and current position information.

Meanwhile, in the place guidance system, there is further comprised of required-time estimating means for estimating a required time for a travel by the first mobile means. Accordingly, it is possible to previously predict correctly a required time for a travel by the first mobile means of a required time to the destination.

Meanwhile, in the place guidance system, there is further comprised of place-information storing means storing information about a place to visit by the second mobile means. Accordingly, it is possible to simultaneously obtain detailed information about a predicted destination.

Meanwhile, in the place guidance system, there is further comprised of destination changing means for changing the destination predicted by the destination predicting means to another destination. Accordingly, in the case that the destination predicted by the destination predicting means is not acceptable, the destination can be changed to another destination.

Meanwhile, in the place guidance system, the destination changing means changes the destination on the basis of use frequency information of a place visited by the second mobile means. Accordingly, it is possible to change the destination to a place greater in use frequency, and to swiftly predict a destination as desired by the user.

Meanwhile, in the place guidance system, the destination changing means changes the destination to another destination of a same sort as the destination first predicted. Accordingly, it is possible to change the destination to a place in the same sort. Because of limitation in sort, prediction is possible to user's desire.

Meanwhile, in the place guidance system, there is further comprised of destination setting means for manually setting the destination, the destination changing means changing the destination to another destination of a same sort as the destination manually predicted. Accordingly, it is possible to input solely a sort, and to automatically predict as a destination an institution greatest in use frequency in the inputted sort.

Meanwhile, in the place guidance system, the destination changing means changes the destination to another destination of a same sort as the destination first predicted. Accordingly, when prediction becomes impossible based on the same sort as that of the first destination, a place in another sort can be predicted as a destination. Destinations can be continuously predicted one after another in an endless fashion.

Meanwhile, in the place guidance system, the second mobile means is walking. Accordingly, when making a travel by walking or so to an institution in a place not to visit by the first mobile means such as a vehicle, the place can be stored as second history information in the travel history storing means.

Furthermore, in the place guidance system of the invention, the second mobile means has positioning means for locating a current position of the second mobile means. Accordingly, route search is possible when making a travel by the second mobile means.

BRIEF DESCRIPTION OF THE DRAWINGS

FIG. 1 is a schematic arrangement diagram of a place guidance system in one embodiment of the present invention;

FIG. 2 is a figure showing an example of a travel log database to be used on the place guidance system in the one embodiment of the invention;

FIGS. 3A–3C are figures showing an example of a travel history table in a travel history database to be used on the place guidance system in the one embodiment of the invention;

FIG. 4 is a figure showing an example of an institution name table in the travel history database to be used on the place guidance system in the one embodiment of the invention;

FIG. 5 is a flowchart showing an operation of the place guidance system in the one embodiment of the invention;

FIG. 6 is a figure showing another example of a travel log database to be used on the place guidance system in the one embodiment of the invention;

FIG. 7 is a figure showing another example of a travel history table in the travel history database to be used on the place guidance system in the one embodiment of the invention;

FIG. 8 is a schematic arrangement diagram of a place guidance system in another embodiment of the invention;

FIG. 9 is a flowchart showing an operation of the place guidance system in another embodiment of the invention;

FIG. 10 is a flowchart showing an operation of the place guidance system in still another embodiment of the invention;

FIG. 11 is a flowchart showing an operation of the place guidance system in yet another embodiment of the invention;

FIG. 12 is a figure showing an example of a category-based institution table to be used on the place guidance system in the yet another embodiment of the invention; and FIG. 13 is a flowchart showing an operation of the place guidance system in further embodiment of the invention.

DESCRIPTION OF THE EXEMPLARY EMBODIMENT

Exemplary embodiments of the present invention are demonstrated hereinafter with reference to the accompanying drawings.

1. First Exemplary Embodiment

FIG. 1 is a schematic configuration diagram showing a place guidance system in one embodiment of the present invention.

The place guidance system in one embodiment of the invention is arranged to be mounted for use on first mobile means, such as a vehicle. As shown in FIG. 1, there are provided a positioning section 101 configured by a GPS receiver or self-contained navigation positioning apparatus for locating a current position of the vehicle, a drive detecting section 102 for detecting driving the navigation function of the present system when starting up the engine of the vehicle, and an end detecting section 103 for detecting an end of operation when terminating the navigation operation of the present system by stopping the vehicle engine or so.

Meanwhile, the place guidance system of this embodiment has a map database 104, an institution input section 105 for inputting the name of an institution or the like visited by second mobile means, e.g., walking, an operating section 106 for inputting various pieces of information and instructions, a travel log database 107 for storing the travel log data of from a start-up time point detected by the drive detecting section 102 over to an end time point detected by the end detecting section 103, and a travel history database 108 for storing a past travel history generated based upon the travel log data.

Furthermore, the place guidance system of this embodiment has a destination predicting section 109 for automatically predicting a destination depending upon the use frequency of an institution stored in the travel history database 108, a required-time estimating section 110 for estimating a time required to a destination predicted by the destination predicting section 109 depending upon a travel history stored in the travel history database 108, a display section 111 for displaying various pieces of information, a speech output section 112 for audibly outputting various pieces of information, and a control section 113 for control of the sections explained above.

Meanwhile, the control section 113 has a navigation control section 114 for displaying on the display section 111 a current position located by the positioning section 101 together with a map stored in the map database 104 and automatically searching a route to a destination as predicted by the destination predicting section 109 or to a destination as set by the operating section 106 thereby displaying it on the display section 111 or providing an audible guidance through the speech output section 112, and a travel log managing section 115 for managing the travel log database 107.

FIG. 2 shows an example of the travel log data stored in the travel log database 107. Namely, the latitude and longitude of a current position located is temporarily stored as travel log data together with a date-and-hour, day-of-the-week and geographic point label to the travel log managing section 115, at a predetermined travel distance interval of from a starting point to an arrival point in a duration of up to an end of travel. As referred later, those are collectively stored to the travel log database 107 when a travel is over, as shown in FIG. 2.

The travel log database example in FIG. 2 shows that a starting point is at 35°39"18' north latitude and 138°22"42' east longitude, whose starting date-and-hour is on Feb. 22, 2003, Saturday, 10:50 AM; a stop point 1 is at 35°38"17' north latitude and 138°20"11' east longitude, whose passage date-and-hour is on Feb. 22, 2003, Saturday, 11:05 AM.

Furthermore, there is shown that a stop point 2 is at 35°38"14' north latitude and 138°20"8' east longitude, whose passage date-and-hour is on Feb. 22, 2003, Saturday, 11:12 AM; an arrival point is at 35°36"19' north latitude and 138°20"41' east longitude, whose passage date-and-hour is on Feb. 22, 2003, Saturday, 11:30 AM, after passing several stop points.

Meanwhile, the travel history database 108 has a travel history table and an institution name table. The travel history table store a history of the positions through which the vehicle has actually traveled. The institution name table stores the position of an institution or the like the user has actually visited by the second mobile means.

For example, as shown in FIGS. 3A to 3C, the travel history table stores the latitude and longitude of a point the vehicle has actually traveled, date-and-hour and day-of-the-week the vehicle has been at the relevant point, and a geographic point label of the relevant point.

Namely, the example shown in FIG. 3A stores the following. Namely, the vehicle left at T Department Store (35°36"18' north latitude and 138°20"41' east longitude) on Jan. 19, 2003, Sunday, 8:00 AM and arrived at the final destination, S Amusement Park, (35°40"53' north latitude and 138°26"34' east longitude) on Jan. 19, 2003, Sunday, 8:28 AM through stop points 3, 4, and so on.

The example shown in FIG. 3B stores the following. Namely, the vehicle left at T Department Store (35°36"19' north latitude and 138°20"42' east longitude) on Feb. 11, 2003, Tuesday, 7:30 AM and arrived at the final destination, S Amusement Park, (35°40"50' north latitude and 138°26"35' east longitude) on Feb. 11, 2003, Tuesday, 8:10 AM through stop points 5, 6, and so on.

Meanwhile, the example shown in FIG. 3C stores the following. Namely, the vehicle left at T Department Store (35°36"19' north latitude and 138°20"41' east longitude) on Feb. 15, 2003, Saturday, 10:50 AM and arrived at the final destination, user's home, (35°39"18' north latitude and 138°22"42' east longitude) on Feb. 15, 2003, Tuesday, 11:30 AM through stop points 7, 8, and so on.

Meanwhile, the institution name table stores, as shown in FIG. 4, geographic point labels on the latitudes and longitudes at the start and arrival points (i.e., starting point is also the arrival point in the immediately preceding travel history) in each travel history stored in the travel history table, institutions the user actually visited by the second mobile means such as walking, and use frequency of the institutions.

In other words, the example of FIG. 4 shows the following. Namely, concerning the geographic point label of S Amusement Park, there are three positioning points in latitude and longitude because of each positioning error by locating section, wherein the user has visited the S Amusement Park ten times from which he/she has visited, by walking for example, store A eight times, store B five times, store C three times, and store D once. Concerning the geographic point label of T Department Store, there are two positioning points in latitude and longitude because of each positioning error by locating section, wherein the user has visited the T Department Store seven times from which he/she visited, by walking for example, store G four times, store H three times, store J once, and store K once.

The institution input section 105, in this embodiment, is configured not only for directly inputting an institution manually but also for communications wirelessly or wiredly with a cellular telephone or personal digital assistant. This is also configured to input an institution name externally acquired by a cellular telephone or personal digital assistant by transferring it wirelessly or wiredly to the institution input section 105.

Namely, the cellular telephone or personal digital assistant is mounted with a function for settling for a product purchase by being provided with a function of a credit card as it is or combined with the existing credit or IC card. Accordingly, settlement is possible on the cellular telephone or personal digital assistant. In the case that settlement has been done, the name of the institution, e.g., the store the settlement has been done, is stored at least to the cellular telephone, personal digital assistant or card.

Accordingly, the cellular telephone or personal digital assistant may be provided with short-distance wireless communication means based on infrared rays or wired connection means such as a connector, and connected to the institution input section 105 through the communication/connection means. By transferring the name of an institution that settlement has been done to the institution input section 105, the user is allowed to correctly input to the institution input section 105, without fail, an institution actually visited on foot.

Meanwhile, in this embodiment, the institution input section 105 is removably arranged on the first mobile means so that it can be carried even when moved by the second mobile means. In case an institution name visited by the second mobile means is inputted to the institution input section 105 at a site of the institution, the control section 113 can receive the information about input facility names, etc. through the wireless communication means or wired connection means. Furthermore, the institution input section 105 of this embodiment has a function to read barcodes or QR codes so that information, such as about facility names, can be inputted by using it.

Now, the operation of the place guidance system in the embodiment of the invention is explained by using FIGS. 1 to 7.

This embodiment is assumed that the travel log database 107 stores the travel log data shown in FIG. 2 while the travel history database 108 stores the travel history tables shown in FIGS. 3A–3C and the institution name table shown in FIG. 4.

Furthermore, this embodiment is explained in the below on an example that the user leaves at his/her home Feb. 22, 2003, Saturday, 10:50 AM, and arrived at the T Department Store at 11:30 AM where he/she finished something to do, thereafter leaving the T Department Store at 2:30 PM (current time).

FIG. 5 is a flowchart showing an operation of the place guidance system in this embodiment. FIG. 6 shows another example of travel log database to be used in the place guidance system in this embodiment. FIG. 7 shows another example of travel history table in a travel history database to be used in the place guidance system in this embodiment.

In FIGS. 1 and 5, when the present system is started up for navigation operation by powering on the present system prior to departing at the T Department Store, the start-up is detected by the drive detecting section 102 (S201). If the start-up for system navigation operation is detected by the drive detecting section 102 (Y at S201), a detection result is supplied to the navigation control section 114. The positioning section 101 starts operation under control of the navigation control section 114, to locate a current position (latitude, longitude, etc.) of the vehicle (S202). When a navigation operation start is not detected by the drive detecting section 102 (N at S201), the drive detecting section 102 repeats to detect a navigation operation.

In this embodiment, the starting point on Feb. 22, 2003, Saturday, 2:30 PM is located at 35°36"18' north latitude and 138°20"42' east longitude (S202) and temporarily stored in the travel log managing section 115. Taking account of errors in locating-the-position data and variations in locating-the-position data due to a broadness of the point being considered, the start point is given properly a geographic point label of T Department Store (S203).

In the state a geographic point label is provided, there is entered a state, at the starting point, allowing to input institution names, etc. visited by walking or so after arriving the T Department Store. Namely, in this state, the display section 111 makes a display prompting to input institution names, such as stores, visited by walking from the T Department Store. The speech output section 112 issues a speech prompting to make a similar input.

If making an input of an institution name visited so far, e.g., stores G and H, on the institution input section 105 following the display or speech for prompting (S204), the input institution name is associated with the start-point geographic point label automatically provided using the map data. This is newly stored, by update, in the institution name table in the travel history database 108. In the case the institution name is already stored in the institution name table, the institution name table is updated to increase the use frequency of the relevant institution (S205).

Namely, in this embodiment, in the case that there is a movement of from the T Department Store to the stores G and H, the institution name table shown in FIG. 4 is updated to increase by one the use frequencies respectively from 4 to 5 and from 3 to 4 because the stores G and H are already stored as to the T Department Store. In the case of a movement of from the T Department Store to stores L and M, the names of the stores L and M are newly stored as frequency information of 1 because the stores L and M are not yet stored in the institution name table shown in FIG. 4.

Now, the T Department Store, although a starting point at the present, is also an arrival point in the immediately preceding travel history (of from user's home to the T Department Store). Accordingly, in this stage, the immediately preceding travel history is completed in order for segmentation. The travel log data in the immediately preceding travel history shown in FIG. 2 stored in the travel log database 107 is transferred to the travel history database 108 under control of the control section 113, and stored therein as a new travel history table shown in FIG. 7 (S206).

In the case of inputting the names of the institutions visited so far by using the institution input section 105, input may be performed by the use of a cellular phone or personal digital assistant as explained before. However, the institution input section 105 is configured allowing for manual input. Hence, input may be made manually while looking bills or other documents or resorting to memory.

Meanwhile, when the institution input section 105 itself is carried during a travel by the second mobile means, the institutions already visited can be inputted during the travel. If input is done during the travel, there is no need for newly inputting the same.

Incidentally, when making no input by using the institution input section 105 despite the display section 111 is making a display prompting for an input or the speech output section 112 is outputting a speech, the geographic point label of the starting point, e.g., T Department Store, as it is is stored as an institution name to the institution name table by increasing one the frequency information. Namely, in the example shown in FIG. 4, the frequency on the T Department Store which is an institution actually visited, is increased by one from 7 to 8.

In this manner, after a travel history is cumulated to the travel history database 108 at S206, then the destination predicting section 109 predicts a destination (S207). Predicting a destination is by the use of the travel history table in the travel history database 108 and the data stored in the institution name table.

Namely, as described above the institution name table shown in FIG. 4 stores all the names of the institutions visited from a certain geological point label, and the institution names are further written with the respective use frequencies. Consequently, by using those use frequencies, an institution greatest in use frequency is predicted as a destination. At this time, higher prediction result is obtainable if predicted based on the current date-and-hour and position.

At first, concerning the current position (e.g., geographic point label of T Department Store, in this embodiment) and time (e.g., 2:30 PM, in this embodiment), extracted is data whose starting-point geographic point label has a position and time meeting a preset allowable range from among the past travel history data stored in the travel history table of the travel history database.

For example, in the case that the start point is the T Department Store and the preset allowable range is "departure at January, 2003 or later" with a result that data extracted is the travel history table of FIGS. 3A–3C, selected first is the S Amusement Park having a geographic point label highest in occurrence frequency of arrival-point geographic point label in respect of the T Department Store as a starting point.

Then, with the institution name table in the travel history database shown in FIG. 4, the S Amusement Park having the highest frequency (frequency: 10 times) is taken as a predicted destination of among the institutions actually visited from the geographic point label of S Amusement Park selected as in the above, for example.

In this case, in case setting is made to select an institution in a position of among the institutions actually visited other than the position fallen under the relevant geographic point label, selected as a predicted destination is the store A (frequency: 8 times) next greatest in frequency that has been visited from the S Amusement Park.

After predicting a destination at S207 in this manner, then the required-time estimating section 110 estimates a required time to the destination (S208). Estimating a required time is by the use of the data stored in the travel history table in the travel history database 108.

Namely, extracted is the travel history data that the current position and the destination predicted in the destination predicting section 109 are respectively met, in geographic point label, with the staring point and the arrival point. Based on a starting time and arrival time in each of extracted travel history data, a required time is calculated, the mean value of which is taken as an estimated required time for the section over which the vehicle as the first mobile means is to travel.

In this embodiment, from the travel history tables in FIGS. 3A and 3B, an average required time of the both is computed to provide (28 minutes+40 minutes)/2=34 minutes.

In this manner, after a destination (actually, institution closest and most frequently used) and a required time to the destination are respectively predicted by the destination predicting section 109 and the required-time estimating section 110, a predicted destination and required time is displayed on the display section 111 (S209) and also audibly outputted through the speech output section 112 (S210).

When the destination and required time to the destination is displayed on the display section 111 and outputted with a speech, the display section 111 makes a display of an inquiry as to whether the relevant destination is acceptable or not (S211). In the case the predicted destination is acceptable without change (N at S211), the same fact is inputted on the operating section 106. Due to this, the relevant destination is established thus staring a route search. In the case to change the predicted destination (Y at S211), a new destination is inputted by the use of the operating section 106 (S212), to make an operation for starting a new route search (S213).

In the above manner, search is newly made for a route to the geographic point label of the destination as predicted or of the destination newly inputted. The new route is displayed on the display section 111, together with the map data stored in the map database 104 (S214).

In any of the cases, thereafter the current vehicle position is located at a predetermined interval, e.g., at a constant time interval or at a constant distance interval, by the positioning section 101. The current position located is displayed on the display section 111, together with the map data stored in the map database 104, the route searched and so on. A route guidance necessitated is provided on the display section 111 and through the speech output section 112.

When the vehicle arrives at around the destination and the navigation operation by this system is over, the presence or absence of ending the operation is detected by the end detecting section 103 (S215). If ending the operation is detected by the end detecting section 103 (y at s215), a result of which is sent to the navigation control section 114. Under control of the navigation control section 114, the positioning section 101 again locates the current position at the relevant time. When ending of the navigation operation is not detected by the end detecting section 103 (N at S215), detective operation is repeated until an operation end is detected by the end detecting section 103.

After an operation end is detected, the latitude, longitude, date-and-hour and day-of-the-week at the current position as located is sent to the travel log managing section 115 where it is added to those of latitude, longitude, date-and-hour and day-of-the-week so far stored at respective positions of from the starting point, thus transferred to and stored in the travel log database 107 (S216) as shown in FIG. 6.

In this manner, according to the present embodiment, the travel history database 108 is configured to cumulate therein not only a travel history of the vehicle as the first mobile means but also a place history the user has actually visited by walking or the like so as the second mobile means. Depending upon the institutions, etc. the user has actually visited on foot, it is possible to predict a destination and required time to the destination. The destination is more practical and convenient for the user as compared to predict a destination based solely on a vehicle travel history.

2. Second Exemplary Embodiment

The first embodiment was configured that the travel history database 108 has an institution name table for storing the names of the actually visited institutions so that the institution name table can be used to predict an actually visited institution as a destination. Furthermore, there may be provided an institution information database storing the information related to those institutions (e.g., information as to what products the institution deals with, or information about what event is to be held by the institution) so that, when the institution is predicted as a destination, the information related to those institutions is displayed simultaneously on the display section 111 or audibly outputted through the speech output section 112. Furthermore, in the case that those institutions are hotels or movie theaters in sort, on-line processing, for lodging reservation or on-ticket reservation, may be applied in accordance with a type of institution.

FIG. 8 is a schematic configuration diagram of a place guidance system thus configured, in another embodiment of the invention. In FIG. 8, those attached with the same references as those of FIG. 1 designate the same ones as those of FIG. 1, and hence omitted of explanation.

FIG. 9 is a flowchart showing an operation of the place guidance system in the present embodiment.

This embodiment has a wireless transmitting/receiving section 801 for acquiring information related to an institution from an external information managing center (not shown) through a wireless circuit or the Internet, and an institution-information database 802 for storing the information related to the information acquired by the wireless transmitting/receiving section 801, in addition to the embodiment shown in FIG. 1. The institution-information database 802 stores, as text information, a store name, unit price and discount fuel, a presence or absence of a car washer and air charge pump, crowdedness, etc. where the institution is a gas station for example, and a store name, menu, today's discount menu, parking lot availability, store crowdedness situation, etc. where the institution is a fast food store for example. When outputting such a piece of information, the control section 113 generates a message for allowing to output a speech by the use of a text-speech synthesizing technique, besides for displaying text information.

The present embodiment operates similarly to the embodiment shown in FIG. 1 before a destination is predicted by a destination predicting section 109 (S201–S206). From then on, the operation is as follows.

Namely, in this embodiment, as shown in FIGS. 8 and 9, the destination predicting section 109 predicts a destination (S207), and then searches through the institution information database 802 under control of the control section 113 (S701).

In the case that there is a predicted institution in the institution information database 802 as a result of search (Y at S702), institution-related information including a store name is displayed on the display section 111 from text information (S703), also generating a voice message related to the institution by use of a speech synthesizing technique.

In the case that there is no predicted institution in the institution information database 802 as a result of search (N at S702), the institution name only is displayed on the display section 111 (S705), thus generating a message of the institution name (S706).

In any of the cases, audible synthesis is made on the generated message (S707), to output a speech through the speech output section 112 (S210). From then on, the operation is similar to that shown in FIG. 2 (S211–S216).

According to this configuration, in the present embodiment, in case there is a predicted destination institution in the facility information database 802, detailed information related to the institution is displayed on the display section 111 and outputted as a speech through the speech output section 112, making possible to effect an excellent destination prediction.

By the wireless transmitting/receiving section 801, the information related to a new institution, etc. can be entered, at any time, to the institution information database 802 through a wireless line or the Internet. Thus, information of a new institution and related thereto is available at any time, thus enabling a guidance with the recent information. Furthermore, in the case that such a predicted destination is a hotel or movie theater, reservation is available through the Internet.

Incidentally, in this embodiment, when the destination predicting section 109 at S207 predicts a destination, the institution information database 802 is searched through under control of the control section 113. However, when a destination predicted by the destination predicting section 109 is not acceptable and a new destination is inputted at S212 by the use of the operating section 212, it may be searched similarly to S702 whether the relevant destination exists in the institution information database 802.

In the case the new destination inputted by using the operating section 106 exists in the institution information database 802, the information related to the destination may be displayed on the display section 111 while a voice message be outputted through the speech output section 112. By this configuration, it is possible to display detailed information related to the institution on the display section, as to not only a destination predicted by the destination predicting section 109 but also a desired destination inputted by use of the operating section 106. This provides further convenience to the user.

3. Third Exemplary Embodiment

FIG. 10 is a flowchart showing an operation of a place guidance system in still another embodiment of the invention. In the embodiment heretofore, when a destination predicted by the destination predicting section 109 is not acceptable (Y at S211), a new destination can be immediately inputted by use of the operating section 106 (S212). This embodiment, in such a case, is to predict a next destination again by the destination predicting section 109.

Namely, as shown in FIG. 10, in this embodiment, when a destination predicted by the destination predicting section 109 is not acceptable, inquiry is made in a state to change the destination (Y at S211) as to whether to automatically predict a next destination by the destination predicting section 109 or not (S801).

When input is made by using the operating section 106 not to automatically predict it (N at S801), the display section 111 makes a display prompting to input a new destination through the operating section 106. In this state, a new destination is inputted by use of the operating section 106 (S212).

In the case that the operating section 106 is used to input information for causing the destination predicting section 109 to automatically predict a next destination (Y at S801), the process returns to S207. Here, the destination predicting section 109 reads an institution name next greater in use frequency out of the institution name table, to predict the institution name as a destination.

With this configuration, in this embodiment, in the case that the destination predicted by the destination predicting section 109 is not acceptable, a next destination can be estimated one after another by the destination predicting section 109. When those destinations are finally unacceptable, manual input can be first made for a new destination through using the operating section 106.

4. Fourth Exemplary Embodiment

In the embodiment shown in the above, a destination is predicted according to an institution use frequency. In this case, by providing category information to the institution of the institution name table stored in the travel history database 108, it is possible to select within a predetermined range a destination predicted one after another in the destination predicting section 109.

FIG. 11 is a flowchart showing an operation of a place guidance system in yet another embodiment of the invention. Although the configuration is similar to that of FIG. 1, the travel history database 108 has further a category-based institution name table shown in FIG. 12 in addition to the travel history tables shown in FIGS. 3A–3C and the institution name table shown in FIG. 4.

Namely, there is prepared a category-based institution name table as shown in FIG. 12 that the actually visited institution, to be taken as a destination (FIG. 4), is provided with information representative of a sort, e.g., category, interest and preference. Using this table, clarified is an institution name same in sort as the first predicted institution name as a destination. Within the range of those institutions, an institution name the next greatest in use frequency is to be read out of the institution name table.

In this embodiment, in case the next institution name of the same sort does not exist, the process manually or automatically moves to another sort where the next institution name can be predicted as a destination.

Namely, in the stage to automatically predict a next destination (Y at S801), it is first determined automatically under the control of the control section 113 as to whether or not the next institution name of the same sort exists in the category-based institution name table (S1101), as shown in FIG. 11. In the case of a determination that there is a next institution name of the same sort (Y at S1101), an institution name next greatest in use frequency within the range of the relevant sort is extracted from the institution name table (S1102) as explained before. This is then predicted as the next destination.

In the case of a determination that there is no next institution name of the same sort (N at S1101), the display section 111 and speech output section 112 are caused to indicate that the next institution name can no longer be predicted in the same sort. Furthermore, the display section 111 and speech output section 112 are caused to make an indication prompting to manually input another sort or automatically input it (S1103). When selecting to manually input another sort by use of the operating section 106 (Y at S1103), the state is to allow for manually inputting another sort.

In this state, if another sort is manually inputted (S1104), the destination predicting section 109 automatically extracts from the institution name table an institution name having the greatest use frequency within the relevant sort according to the inputted sort (S1105). The read institution name is predicted as a next destination.

Meanwhile, in the case of making an input for automatic movement to another sort (N at S1103), an institution name greatest in use frequency in the remaining sort is extracted from the institution name table and predicted as a destination (S1106).

Namely, in this embodiment, in the case that the institution the destination predicting section 109 has first predicted by the use of the institution name table of FIG. 4 is store A (frequency: 8 times) in fast food store shown in FIG. 12 but the user has not accepted the store, then the destination predicting section 109 predicts store C (frequency: 3 times) of the same sort of fast food store by use of the category-based institution name table of FIG. 12. Meanwhile, in the case that there is no satisfactory destination in the sort of fast food store or there is no institution for selection in the sort of fast food store, selected is an institution greater in use frequency in another sort, e.g., store B (sort: convenience store, frequency: 5 times) from the institution table of FIG. 4.

Incidentally, in this embodiment, when predicting a next destination at S801 in FIG. 11, it is possible to manually input only a desired sort of destination on the operating section 106. In such a case, the next institution will be searched for at S1101 according to the sort inputted.

As described above, according to the present embodiment, the travel history database has the category-based institution name table. Hence, the destination the destination predicting section 109 is to predict can be limited within destinations of the same sort as the destination first predicted, thus enabling to swiftly predict a destination to user's desire.

5. Fifth Exemplary Embodiment

FIG. 13 is a flowchart showing an operation of a place guidance system in further embodiment of the present invention. The embodiment heretofore is to output a route guidance over to a point for a travel by the first mobile means. In this present embodiment, the second mobile means has positioning means, making it possible to make a guidance of a route of from an end point of the first mobile means to a destination by the second mobile means.

Namely, it is first determined whether or not the second mobile means has positioning means, such as a GPS function (S1301), as shown in FIG. 13. On this occasion, a presence or absence of positioning means may be determined and inputted by the user, or automatically determined by connecting the terminal unit used by the second mobile means with the terminal unit used on the first mobile means wiredly or wirelessly. Meanwhile, where the terminal units used on the first and second mobile means are the same, the second mobile means naturally possesses positioning means.

Here, in the case that the second mobile means has positioning means (Y at S1301), the terminal unit used on the first mobile means sends only destination-position information to the terminal unit used on the second mobile means (S1302). The terminal unit used on the second mobile means, when getting destination-position information, searches for a route to the destination within the terminal unit (S1303). According to the route information searched, a guidance is provided to the destination while locating the current position by use of the second mobile means (S1304).

On the other hand, where the second mobile means does not have positioning means (N at S1301), a route to the destination is searched on the terminal unit used by the first mobile means (S1305), the route information to a searched destination is sent to the terminal used on the second mobile means (S1306). The terminal unit used on the second mobile means, after acquiring route information to the destination, makes a mapping over the map so that the user can start a travel while referring the map (S1307). In this case, the second mobile means cannot make a guidance during travel because of the absence of positioning means.

As described above, according to the present embodiment, because the second mobile means has positioning means, route search or route guidance is available by the second mobile means. This is very useful for the user where the destination is located at a position he/she is to visit not so frequently.

Although the embodiments so far explained are to predict a destination by use of a use frequency of an institution actually visited by the second mobile means, such as walking, prediction may be by taking account of a date-and-hour actually visited besides a use frequency. Namely, in this case, determination is made such that the newer the date-and-hour of actual visit, the greater is utility value. It may be given a greater weighting than the old one so that a destination can be predicted for by taking into account a use frequency.

Incidentally, in these embodiment, although the first mobile means assumed a vehicle, it can use an airplane, a tram, a motorcycle, a bus, a taxi or the like. Meanwhile, although the second mobile means assumed walking, it can use another vehicle such as an automobile, a motorcycle, a lent-a-car or the like in place of walking. Furthermore, although a series of travels to a destination is separated by the difference of mobile means, e.g., first mobile means and second mobile means, travel to a destination may be separated by positioning means instead of mobile means where positioning means are different or there is a presence or absence of positioning means on the same mobile means.

Meanwhile, in the embodiment heretofore, for the predicted destination, a travel end point of the first mobile means is established by a latitude and longitude of a geographic point label in a institute name table of travel history database shown in FIG. 4 prepared based on a past travel history. However, in the case the second mobile means has positioning means, the user may be suggested by another point to travel by a mobile form of the first mobile means and closest to the destination, as a travel end point of the first mobile means. For example, where the first mobile means is a car and the second mobile means is walking, suggested is a parking lot accessible by the first mobile means and closest to a travel point of the second mobile means. By doing so, the user is allowed to find an optimal route that could not be aware of by himself.

Furthermore, although the foregoing embodiments explained the case having two mobile means, the invention is not limited to this, i.e., the invention is applicable where there are three or more mobile means, such as third and fourth ones.

Meanwhile, although the foregoing embodiments explained the case that travel is by the second mobile means from a end point of the first mobile means, the invention is not limited to this, i.e., application is naturally possible to the case that travel is by the second mobile means from a stop point in the course of the first mobile means or another point past visited by the second mobile means.

As described above, according to the place guidance system of the present invention, it is possible to estimate for an institution actually visited by the second mobile means, such as walking, as a destination. Practical estimation of a destination is possible for user's intention.

What is claimed is:

1. A place guidance system for providing information regarding a destination collected using at least two different forms of transportation, comprising:
   positioning means for locating a current position of first mobile means;
   travel history storing means for storing first history information about a travel of the first mobile means collected using a first form of transportation and located by the positioning means and second history information about a place visited by second mobile means collected using a second form of transportation, different from the first form of transportation, the second history information sharing at least one common geographic point with the first history information; and
   destination predicting means for predicting athe destination based on the second history information stored in the travel history storing means.

2. A place guidance system according to claim 1, wherein the destination predicting means predicts the destination on the basis of use frequency information of a place visited by the second mobile means.

3. A place guidance system according to claim 1, wherein the second history information includes date-and-hour information of a visit by the second mobile means, the destination predicting means predicting the destination on the basis of a current position of the first mobile means located by the positioning means and date-and-hour information of a visit by the second mobile means.

4. A place guidance system according to claim 1, further comprising required-time estimating means for estimating a required time for a travel by the first mobile means.

5. A place guidance system according to claim 1, further comprising place-information storing means storing information about a place to visit by the second mobile means.

6. A place guidance system according to claim 1, further comprising destination changing means for changing the destination predicted by the destination predicting means to another destination.

7. A place guidance system according to claim 6, wherein the destination changing means changes the destination on the basis of use frequency information of a place visited by the second mobile means.

8. A place guidance system according to claim 6, wherein the destination changing means changes the destination to another destination of a same sort as the destination first predicted.

9. A place guidance system according to claim 6, further comprising destination setting means for manually setting the destination, the destination changing means changing the destination to another destination of a same sort as the destination manually set.

10. A place guidance system according to claim 7, wherein the destination changing means changes the destination to another destination of a same sort as the destination first predicted.

11. A place guidance system according to claim 1, wherein the second form of transportation of the second mobile means is walking.

12. A place guidance system according to claim 1, wherein the second mobile means has positioning means for locating a current position of the second mobile means.

13. A place guidance system according to claim 6, wherein the second form of transportation of the second mobile means is walking.

14. A place guidance system according to claim 6, wherein the second mobile means has positioning means for locating a current position of the second mobile means.

15. A place guidance system according to claim 1, wherein the first and second forms of transportation are by wheeled vehicle and by foot, respectively.

* * * * *

UNITED STATES PATENT AND TRADEMARK OFFICE
CERTIFICATE OF CORRECTION

PATENT NO. : 7,058,506 B2 Page 1 of 1
APPLICATION NO. : 10/867136
DATED : June 6, 2006
INVENTOR(S) : Kazushi Kawase et al.

It is certified that error appears in the above-identified patent and that said Letters Patent is hereby corrected as shown below:

<u>Title Page, Item (56) References Cited, FOREIGN PATENT DOCUMENTS</u>
Change "DE 195 35 376" to -- DE 195 35 576 --

<u>Column 14</u>
Line 58, change "athe" to -- the --

Signed and Sealed this

Seventh Day of November, 2006

JON W. DUDAS
*Director of the United States Patent and Trademark Office*